US012629627B1

(12) United States Patent
Coleman

(10) Patent No.: US 12,629,627 B1
(45) Date of Patent: May 19, 2026

(54) HIGH-THROUGHPUT THERMOACOUSTIC DEVICE FOR SEPARATION OF FLUID DYNAMICAL MIXTURES

(71) Applicant: Evan Austen Coleman, Boston, MA (US)

(72) Inventor: Evan Austen Coleman, Boston, MA (US)

( * ) Notice: Subject to any disclaimer, the term of this patent is extended or adjusted under 35 U.S.C. 154(b) by 350 days.

(21) Appl. No.: 18/211,479

(22) Filed: Jun. 19, 2023

Related U.S. Application Data

(60) Provisional application No. 63/355,013, filed on Jun. 23, 2022.

(51) Int. Cl.
| | |
|---|---|
| *B01D 49/00* | (2006.01) |
| *B01D 51/08* | (2006.01) |
| *B01D 53/30* | (2006.01) |
| *B01J 19/10* | (2006.01) |

(52) U.S. Cl.
CPC .......... *B01D 49/006* (2013.01); *B01D 53/30* (2013.01); *B01J 19/10* (2013.01); *B01D 51/08* (2013.01); *B01D 2257/7025* (2013.01); *B01D 2258/06* (2013.01); *B01D 2259/816* (2013.01); *B01L 2400/0436* (2013.01)

(58) Field of Classification Search
None
See application file for complete search history.

(56) References Cited

FOREIGN PATENT DOCUMENTS

| | | | | |
|---|---|---|---|---|
| WO | WO-0041794 A1 * | 7/2000 | .............. | B01J 19/10 |
| WO | WO-2012017976 A1 * | 2/2012 | ......... | B01D 19/0078 |

OTHER PUBLICATIONS

WO2012017976A1-preview (IP.com machine translation of Murata) (Year: 2012).*

* cited by examiner

*Primary Examiner* — Gabriel E Gitman

(57) ABSTRACT

The present invention relates to the thermoacoustic separation of sparse or dilute particulates, liquids, or gases from any substance whose motion is appropriately described by hydrodynamics. It is applicable in a broad range of scientific and industrial contexts because it is designed to partially reverse the process of mixing, albeit at a significant energy cost. Relative to similar devices, it is novel because it has been configured to process material in a continuous flow, so operates without the use of a closed, fixed-volume separation chamber. When operated at high throughput, this device is designed to capture significant quantities of valuable but sparse commodities from large volumes of multi-component mixtures, on industrially-competitive timescales, without necessitating chemical inputs or strong electromagnetic fields.

25 Claims, 12 Drawing Sheets

HIGH-THROUGHPUT THERMOACOUSTIC DEVICE FOR SEPARATION OF FLUID DYNAMICAL MIXTURES

This application claims the benefit of U.S. Provisional Patent Application No. 63/355,013, filed on Jun. 23, 2022. Such application is incorporated herein by reference in its entirety.

FIELD OF THE INVENTION

Modern chemistry, biology, and nuclear physics heavily rely on the ability to generate concentration gradients in multi-component solutions. The invention described herein is capable of partially un-mixing such solutions, with the intent to isolate subcomponents within any miscible combination of fluids, gases, or particulates.

DESCRIPTION OF THE RELATED ART

In statistical mechanics, one of the canonical examples of thermodynamic irreversibility is the process of mixing. In simple terms, this means that separating specific components of mixtures requires an energy input to the system no less than the Gibbs free energy change, $\Delta G = -T\Delta S$, where T is the temperature of the ensemble and $\Delta S$ is a change in its entropy. Additional inefficiencies are generally incurred due to dissipative effects and the minimum entropy production principle. Nevertheless, devices which are capable of un-mixing solutions or mixtures are extremely valuable. The centrifuge is an excellent example: using the centripetal force that acts on an object in uniform circular motion, a centrifuge generates a concentration gradient which separates the components of a solution based upon their relative mass differences. However, practically generating concentration gradients in a large volume is no straightforward task. A centrifuge would not work, for example, because its throughput is far too small, and processing large volumes would likely require a combination of compression (which is energetically expensive) and prohibitively large-scale hardware.

Differentiating heavy materials is challenging with a centrifuge, because the apparatus requires more and more physical space to do so without incurring losses in separation efficacy. In other words, if the chamber is not large enough, the higher-mass components of the solution will accumulate at the farthest end of the capture volume, leading to losses in separability. Such a device is also impractical for separating extremely diffuse multi-component substances, such as gaseous mixtures. For example, for the extraction of greenhouse gases (GHGs) from air, it would be inadvisable to use a centrifuge to capture industrial emissions at the megaton or gigaton scale. One would have to compress that mass of air into a chamber and spin it at high $\omega$. This phenomenon would generally suggest to use smaller-scale hardware, but the consequence of such a design decision is to drastically limit separation throughput. In both scenarios, the requirement that the processing chamber be fixed in volume is ultimately what limits the efficacy of the device. Additionally, if friction between the components of the solution is large, such as for a collection of particulates in solid phase or for a highly viscous fluid, then significant separation may not be possible with any reasonable energy input.

Nevertheless, direct air capture (DAC) for the sequestration of atmospheric GHGs would greatly benefit from a similar capability. Efficient isolation of GHGs within a large volume of air would open doors to improved scrubbing or scalable removal methods, as some reactions are not possible at low concentrations (e.g. methane, which does not ignite in air at STP below 50,000 ppm [1]). Similarly, sand mining can involve sifting sandflows which approximately obey the laws of fluid dynamics. Extracting higher-purity silicon from silica sands is one such application.

In the spirit of these use cases, our task is to separate some fluid-dynamical solution into components as it moves continuously through a chute or chamber, without drastically changing its volume (minimal compression) or necessarily changing its temperature (minimal heating). In such a setting, only so many phenomena may act to generate a force gradient, and subsequently a concentration gradient: chemical interactions, field-based interactions (e.g. electromagnetism or gravity), and sound. The first depends on the existence of effective reactive catalysts for the compound of interest, and is not generally feasible. The second is energetically and materially impractical, as strong electromagnetic fields are currently expensive to deploy, and gravity is too weak to impact the distribution of fluids and gases at human length scales. One final option remains: pulsing sound waves into the medium.

Designing a sound pulse with the purpose of e.g. isolating GHGs from air is a prohibitively challenging many-body physics problem. Nevertheless, it has been achieved previously in gases, via scientific developments in thermoacoustics, for specific atomic populations [2, 3, 4, 5]. In those earlier apparati, it was important for the functioning of the device that the capture volume be fixed, so that the gas could be contained while the sound was applied to it. Thus, those devices can be expected to suffer many of the same equipment scaling and throughput challenges as centrifuges do, and cannot effectively process large volumes of material on industrially-competitive timescales. In this regime of large processing volume, one requires the ability to control throughput freely, without scaling the device hardware, even when doing so would come at the cost of increased energy consumption, noise output, and the like.

Approximate solutions to this problem specification are made possible due to recent developments in machine learning[6]. When an engineering project utilizes a highly fine-tuned system with many moving parts, modeling its dynamics to improve functionality can be prohibitively time-intensive. This is especially true if one wishes to optimize over the space of all possible apparata which would achieve the same goal, because such a parameter space is enormous, and testing improvements by e.g. computer simulations at each point in that parameter space is prohibitively costly. With reinforcement-based machine learning approaches, however, one can collect empirical data in real time to optimize outcomes through positive and negative reinforcement, provided one designs their apparatus in a modular fashion and builds an artificially intelligent agent or policy to control it. This optimization technique presents a critical tool which enables the identification of imperfect but useful solutions to challenging many-body physics problems, such as the task of fluid un-mixing.

BRIEF SUMMARY OF THE INVENTION

The device proposed herein is designed to generate concentration gradients in a large-volume mixture whose motion upon agitation is described approximately by hydrodynamics. It achieves this goal by applying sound algorithmically to the mixture. The profile of sound output by the device at any given time in its operation may be determined by an artificially intelligent agent.

OBJECTS OF THE INVENTION

The principal object of the invention is to achieve a stochastic process which separates the components of a fluid or gaseous mixture as it propagates through a linear chamber or chute. Specific use cases of interest are:

1. Separating pollutants from air for capture and sequestration, including greenhouse gases and PM2.5;
2. Reprocessing mining waste or fly ash, e.g. for gallium extraction from coal waste;
3. Sand mining, e.g. for extraction of high-purity silicon; and
4. Electronic waste recycling.

An example of the first use case is the sequestration of atmospheric methane ($CH_4$) in the context of greenhouse gas capture and sequestration. While this is per-haps one of the most technically challenging among these applications to achieve, it may be analyzed simply and from first principles because air behaves as an ideal gas, to good approximation and under generic conditions. Direct air capture of $CO_2$ is made feasible by the existence of catalytic air scrubbing techniques, developed for e.g. regulation of submarine environments. However, this is not the case for greenhouse gases (GHG's) more broadly. As such, scrubbing the atmosphere of these gases is prohibitively inefficient. The apparatus proposed here is designed to enable the isolation of dilute gases in a large volume more efficiently in direct air capture facilities. For example, methane is roughly 80× more potent than $CO_2$ as a GHG (per $GWP_{20}$) [7], and as such is typically ignited when emitted in high concentrations, to mitigate its effects and trade them for those of $CO_2$. However, methane emissions are generally broad-source rather than point-source, so it is of interest to learn a stochastic process which increases the concentration of methane in localized subregions of a large control volume.

To specify the challenge more mathematically, suppose the subcomponents of a mixture fall into three non-empty categories: desirable (D), undesirable (U), and benign or beneficial (B). In the use case of methane capture, D is methane, B is oxygen, and U are the other components of air (argon, carbon dioxide, nitrogen, and so on). Suppose air propagates at a regular speed through a linear chamber, and consider the cross-section of the at some fixed distance. Let D physically represent the regions of the cross-section where the desirable concentration $c_D$ is above a fixed threshold $\overline{c}_D$ (e.g. 5% for the purposes of igniting methane), and let U be the regions where the undesirable concentration $c_U$ is above a separate fixed threshold $\overline{c}_U$. Consider a cross section of the high-throughput chute described above. If |D| represents the area of region D, the Dice coefficient is:

$$\text{Dice}(D, U) = \frac{2|D \cap U|}{|D|+|U|} = \frac{2|D \cap U|}{|D \cup U| + |D \cap U|} \leq 1, \text{Dice}(D, U) \geq 0.$$

In this particular problem specification, the object of the apparatus is to minimize the Dice coefficient and bring it as close as possible to 0, segmenting the desirable and undesirable populations into distinct regions of the chamber cross-section. Notably, both the shapes and number of components of D or U may take many different forms. The device as proposed is designed to solve for whatever topologies will maximize segmentation efficiency given the specification of the problem and the space of physical possibilities which may be either traversed through optimization or enumerated analytically. Note also that the Dice coefficient is made less trivial by the presence of another population B with nonzero concentration $c_B$, because $c_D = 1 - c_U - c_B$.

The technical specification above may change slightly based upon the specific use case. For example, the device described in the subsequent sections to solve this class of problems involves significant energy consumption. It will likely be necessary to include these and other factors as considerations in the optimization procedure outlined below. However, the application of the technology—partial unmixing of a large volume of a multi-component fluid-dynamical solution—is expected to remain the same irrespective of energy costs or similar complications.

BRIEF DESCRIPTION OF THE DRAWINGS

For a more complete understanding of the invention, reference is made to the following description and accompanying drawings, in which are depicted.

DETAILED DESCRIPTION OF THE INVENTION

The materials input to the device described herein will have the following properties: (1) They are impure mixtures, i.e. they contain at least two separable subcomponents which can themselves be considered "pure"; and (2) the motion of the mixture when agitated may be described approximately by the laws of fluid dynamics, with added viscosity, dissipation, or other effects due to physical interactions between mixture subcomponents.

The device outputs will have the following properties relative to the inputs: (1) They will be spatially separated into an arbitrary number of distinct chambers; (2) the relative composition or concentrations of the materials in each distinct output chamber will be different; and (3) in at least one of the output chambers, at least one of the mixture subcomponents will be in higher concentration (i.e. higher purity) than it was in the input mixture.

Figure 1:
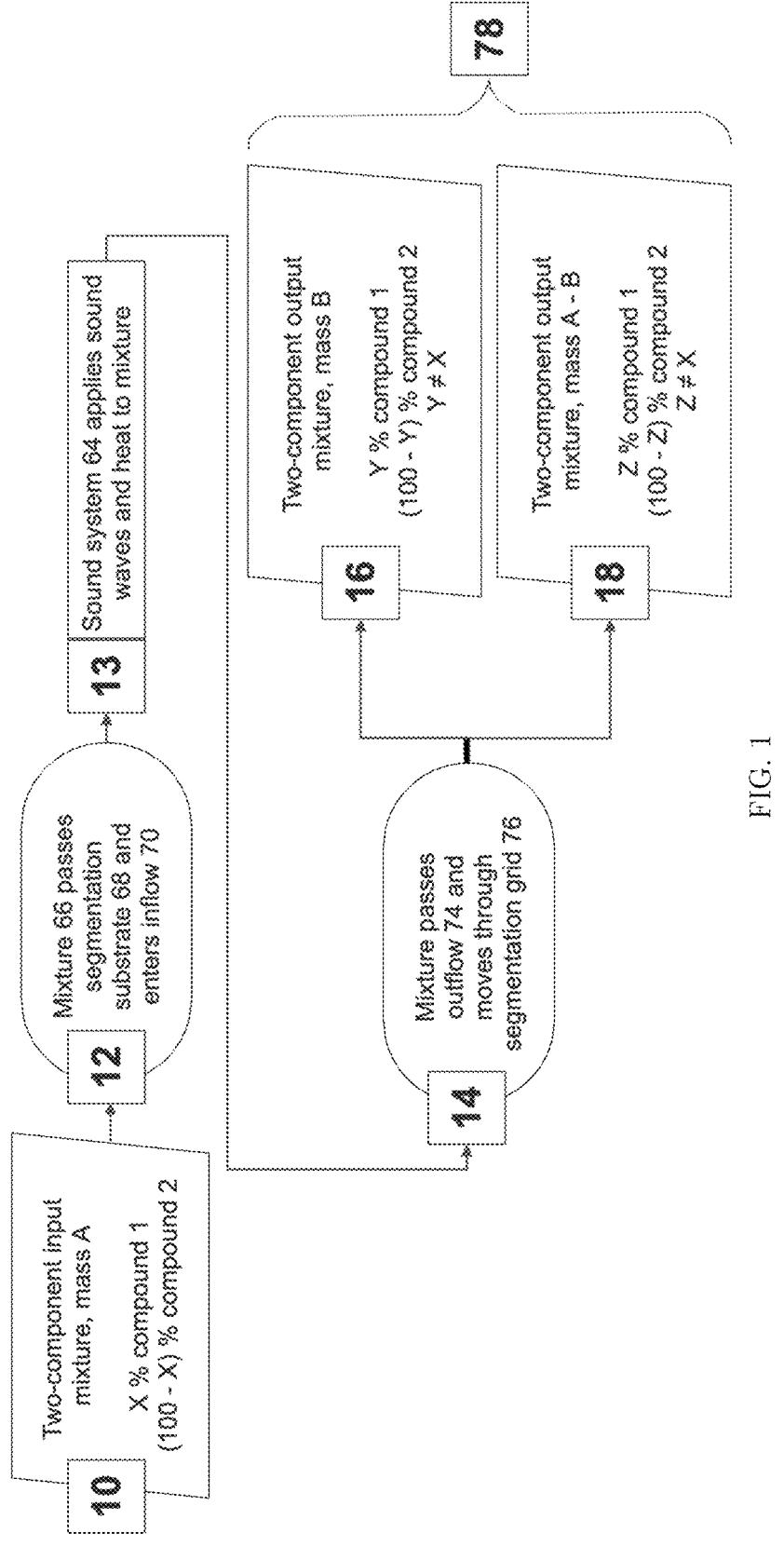
FIG. 1 A process flow diagram for an input mixture of two components for the device operating in the deployment phase.
Figure 2:
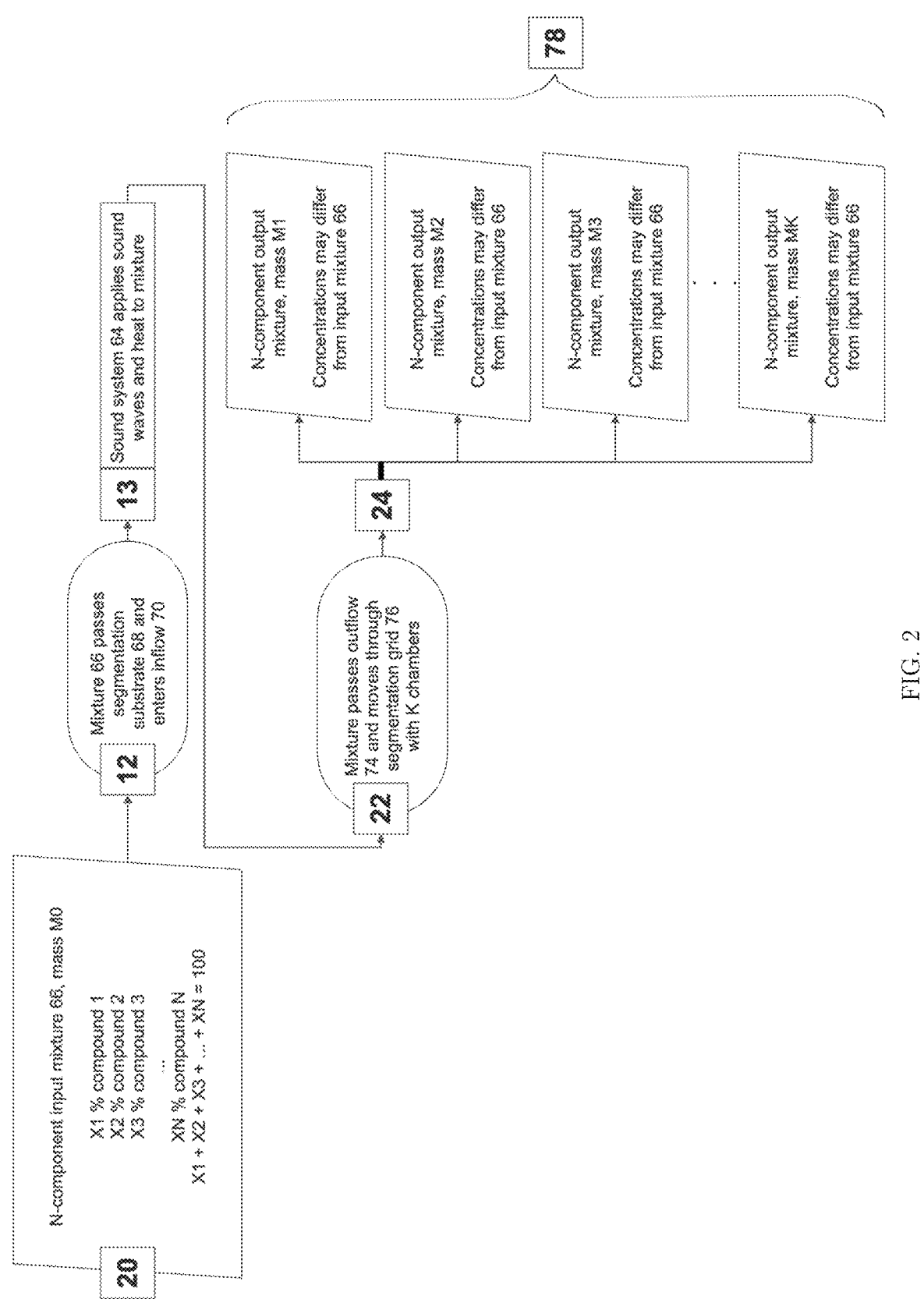
FIG. 2 A process flow diagram for an input mixture of arbitrarily many components (N), for the device operating in the deployment phase, wherein the input mixture is segmented into arbitrarily many populations (K) via the segmentation grid.

The flow diagram of FIG. 1 exemplifies, for a mixture of two subcomponents and two output chambers, the change between input and output due to the function of the proposed device. The flow diagram of FIG. 2 demonstrates the same process, but for a mixture of arbitrarily many components and output chambers.

In the two subcomponent mixture process, the input mixture is received at step 10. The mixture passes through segmentation substrate 68 (shown in FIG. 4 and FIG. 5) and enters inflow 70 at step 12. Sound system 64 applies sound waves and heat to the mixture in step 13 within linear flow chamber 90. The mixture then passes through outflow 74 and moves through segmentation grid 76 at step 14, becoming the segmented output mixtures 78. The result of this process then is a two-component output, at steps 16 and 18. The many-subcomponent process is generally similar, except that at step 20 an arbitrarily large number of subcomponents are received at the output, the segmentation grid 76 has a corresponding number of chambers at step 22, and the result of the process is multiple component outputs, collectively shown at step 24.

Figure 4:
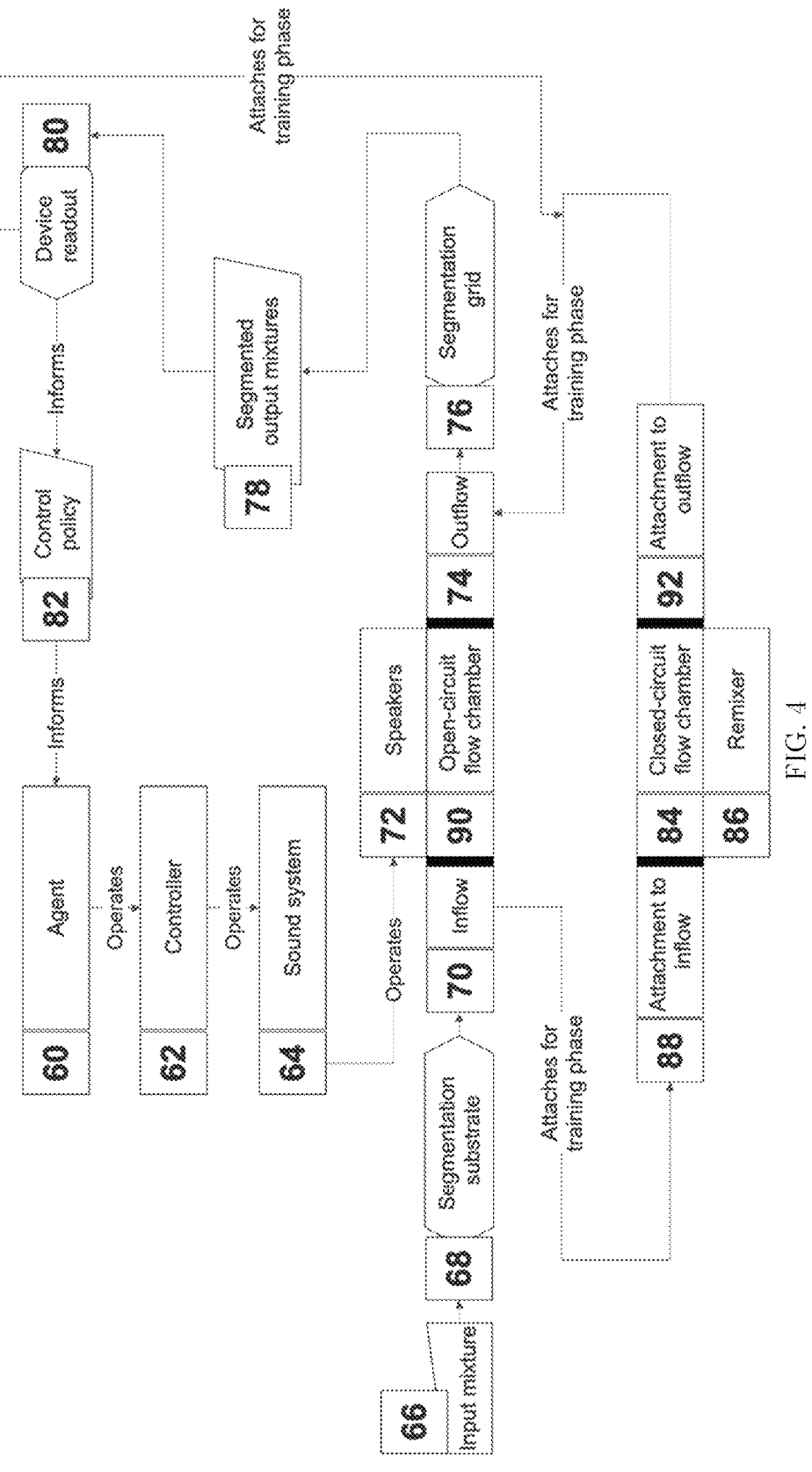
FIG. 4 A process flow diagram depicting the hardware configuration of the device, in both training and deployment phases.
Figure 5:
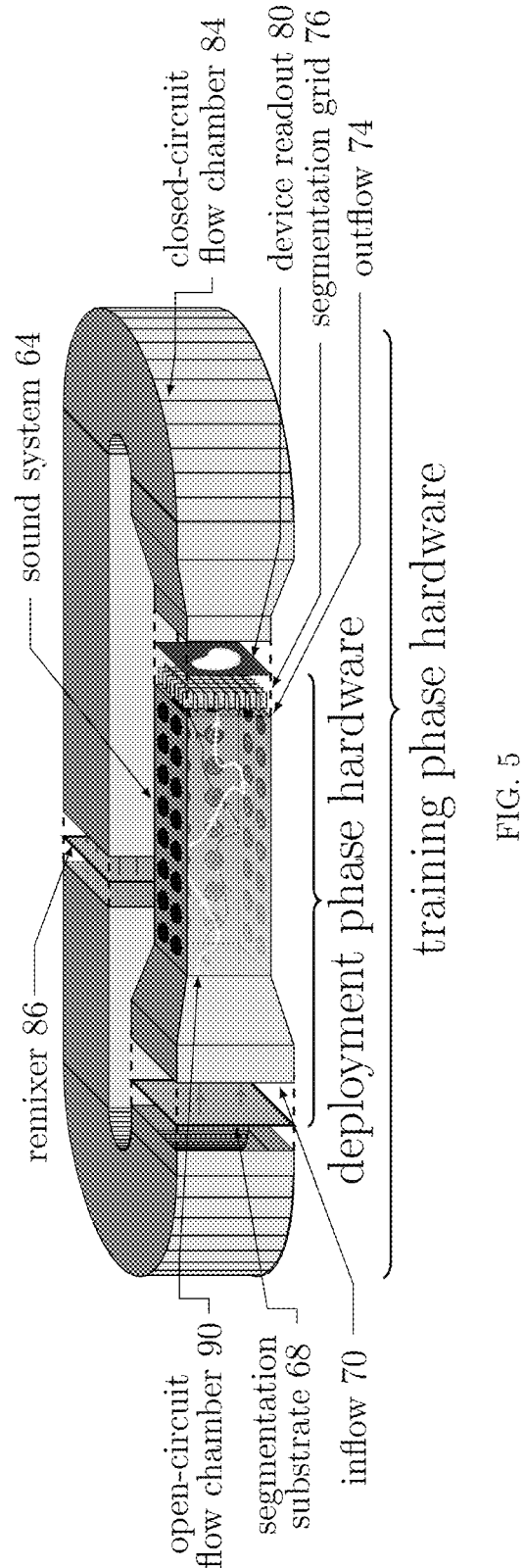
FIG. 5 A schematic of the proposed device, excluding the controller and agent. The apparatus operates in two phases, labeled "deployment" and "training," with different equipment required in each phase.

The basic, most critical element of the device involves an airflow chamber or wind tunnel (termed the flow chamber) which transitions between an open-circuit (e.g. straight line) flow 90 and a closed-circuit (e.g. circular) flow 84, as shown in FIG. 4 and FIG. 5. It also requires an array of speakers or sound emitters 72, and audio amplification and control equipment (termed the sound system 64). Visual, optical, and other sensors attach to the interior of the chamber to monitor the behavior and composition of materials that flow through it. In the closed-circuit component 84 of the flow chamber, a device termed the remixer 86 churns the flowing mixture at a variable rate. A computer (termed the controller 62) connects to the sensors and sound system 64 and has an interface which can control the audio equipment and flow from a safe distance. A software program (termed the agent 60), running on a computer which may in principle be separate from the controller 62, has access to the interface and controls, and may manipulate the apparatus in an automated fashion. When using closed-circuit flow chamber 84 configuration, inflow attachment 88 may be used at inflow 70, and outflow attachment 92 may be used at outflow 74. FIG. 4 depicts how each of these device components connect and interact with one another.

When the flow chamber sits in the open-circuit configuration 90, the opening at which the input mixture 66 enters the device is termed the inflow 70. Similarly, the opening at which the output exits the device is termed the outflow 74. At the outflow 74, additional equipment (such as piping) may be fitted to the chamber in order to capture material flowing through distinct areas of the outflow cross-section, and we term this the segmentation grid 76. Similarly, equipment may be fitted at the inflow 70 in order to ensure that the material entering the flow chamber achieves a given initial condition, and we term this the segmentation substrate 68.

In cases where the agent behavior is specified explicitly by human-coded instructions, we refer to its behavior as automated, whereas in cases where the agent behavior is optimized (even if only partially) over a space of large possibilities, we refer to its behavior as being determined by the control policy.

The combination of sensors which is required for the successful operation of the device for a given input mixture is termed the device readout 80, or equivalently the agent environment. The sensors making up the readout will vary depending on the application. These may include, but are not limited to, optical spectrometers, thermal sensors, air pressure sensors, and particulate size analyzers. Properties of the input which determine the group of sensors best suited to a given challenge may include the atomic numbers of the constituents, their molecular bond content and distribution, their particulate size and shape distributions, and their chemical phase structure, among others.

Figure 3:
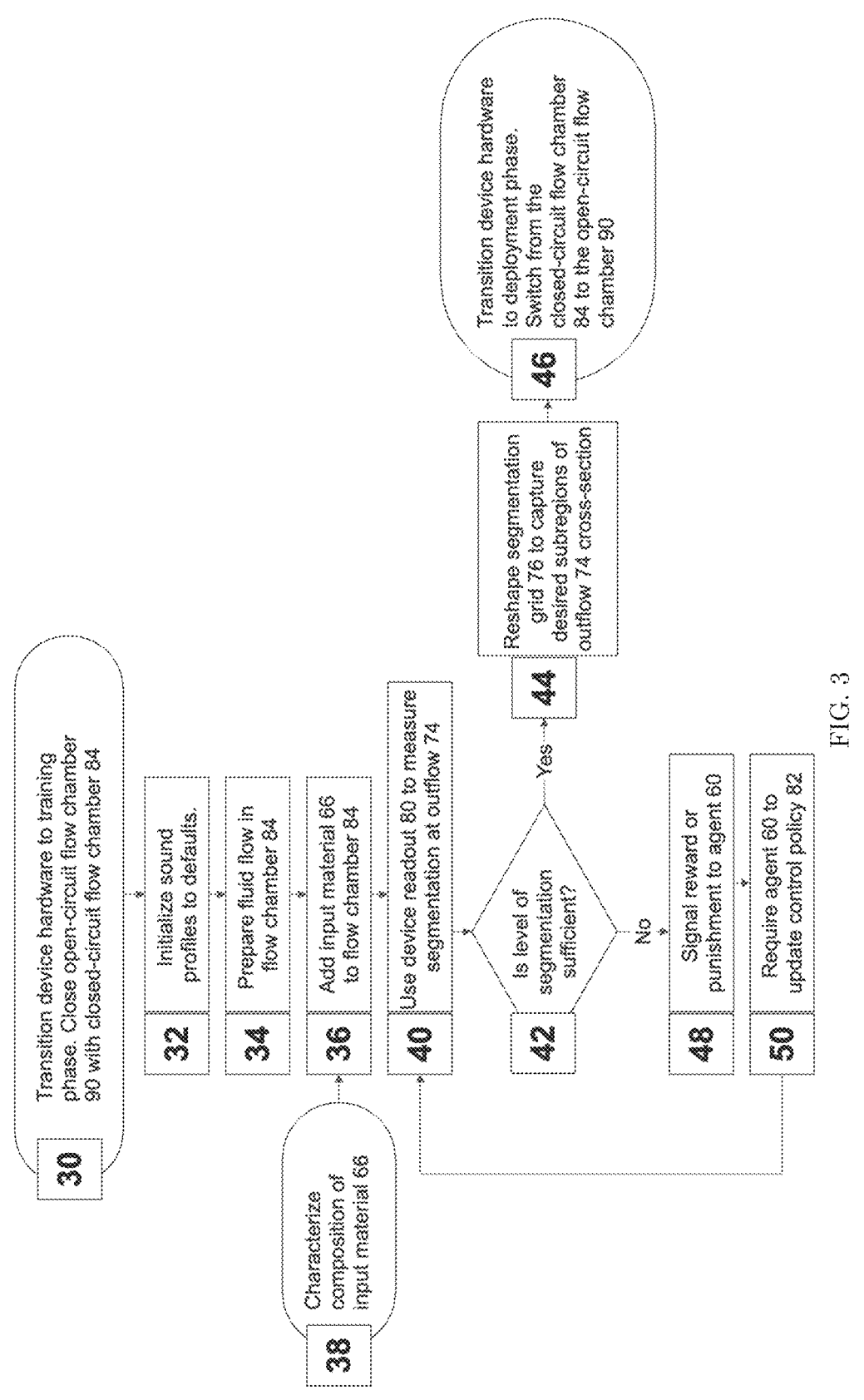
FIG. 3 A process flow diagram depicting the training phase of the device.

The basic procedure underlying the function of this apparatus is described herein, and is depicted schematically in FIG. 3 and in FIG. 5. The latter figure shows a schematic of the device according to an embodiment of the invention, excluding the controller 62 and agent 60. The device functions in two separate operational phases: "deployment" and "training," each requiring different equipment. These phases are complementary to one another, but serve separate purposes in the construction and operation of the device. The deployment phase is the configuration of the hardware which is capable of converting input material to output material as described above. The training phase serves to accelerate optimization of the apparatus, so as to better achieve its function during the deployment phase. In FIG. 5, these differences are exemplified. It is shown that the deployed phase accepts a mixed, propagating fluid as input, depicted as a gray square at the inflow 70. The apparatus applies a learned waveform from sound system 64 to separate the fluid into independent populations, depicted as amorphous white and black regions in the outflow 74. The learned waveform is developed using data collected in the training phase, wherein the fluid flow circuit is closed. After the device segments the gas, the fluid output is re-mixed and fed back into the flow chamber. An optimization procedure is applied to the waveform, updating it in order to maximize the segmentation of the fluid.

Deployment phase. The hardware in its "deployment" phase requires the open-ended configuration 90 of the flow chamber, with a grid of speakers 72 attached to the interior, and designated inflow 70 and outflow 74 regions as explained above. The fluid medium to be processed propagates through the shaft from the inflow 70 toward the outflow 74, and the speakers 72 are directed to pulse sound into the medium by a multi-channel sound controller 62. The effect of the sound is to convert the input material into redistributed, unmixed output as described above, and as depicted in FIG. 1 and FIG. 2. At the outflow, the segmentation grid 76 separates the processed material into the desired output populations, for subsequent capture or sequestration.

Training phase. The operation of the device in the deployment phase requires understanding the particular combination of sound that will achieve sonic segmentation within the material passing through the flow chamber. In order to achieve this understanding, the profile of those sound pulses is learned in a separate "training" phase via behavioral reinforcement of the agent 60, which is responsible for tuning the sound controller 62 and modifying or modulating the pulse profile via its control policy 82.

Before any training has been performed, the sound pulses are initialized to some fixed value, e.g. single-frequency, in-phase, and uniform in intensity, at step 32 as shown in FIG. 3. Up to this point, the flow chamber is closed and segmentation grid 76 is not in place, as shown at step 30. Then, in the training phase, the open-circuit shaft is sealed off into a closed-circuit system 84. The closed-circuit hardware has the ability to (1) maintain a controllable and continuously-measurable fluid flow through the entire circuit, (2) determine the output concentrations of fluid subcomponents in the segmentation grid 76 at the outflow 74 of the deployment hardware (as part of the device readout 80), and (3) re-mix or reset the partially mixed solution at the outflow 74 to its prior distribution at the inflow 70. Attachments to inflow 88 and outflow 92 provide this functionality. Further, this provides controlled conditions for the agent 60 or control policy 82 to update the sound pulse profile that it applies to the fluid mixture. Fluid flow is prepared at step 34, and then, when the composition of the input material has been characterized at step 38, this material is added to closed-circuit flow chamber 84 in step 36. Device readout 80 is used to measure segmentation at outflow 74, at step 40, and then at decision step 42 the device determines whether the segmentation level reached to this point is sufficient. If not, a reward/punishment signal is sent to agent 60 at step 48, and then control policy 82 is updated by agent 60 at step 50. Processing then returns to step 40. If, at decision step 42, it is determined that the level of segmentation is sufficient, then at step 44 segmentation grid 76 is reshaped by the device to capture desired subregions of the cross-section of outflow 74. At step 46 then, processing moves on from the training phase to the deployment phase, in which closed-circuit flow chamber 84 configuration will be changed to linear flow chamber 90 configuration, and segmentation grid 76 is added to the outflow.

Enumerated, the training steps can be abstractly described as:

1. Run the gas or fluid through the chute and apply the sound pulse continuously.
2. In a cross section of the chamber, sample sub-component concentrations in a grid at a fixed time using the device readout 80.
3. If the subcomponent populations in the chamber have higher (or lower) concentration than in the previous step by some appropriate measure, signal a reward (or punishment) to the agent 60.
4. Using this feedback, the agent 60 updates the control policy 82, making a change to the waveform that it applies to the flow chamber.
5. Go back to step 1 and iterate this process until segmentation efficiency (here defined abstractly) is maximized (or nearly maximized). Then, remove the closed-circuit hardware and move to the deployment phase.

The reward system, as well as the response of the device to feedback, must be appropriately modeled. However, under generic conditions and given enough training data, the model is guaranteed to converge to the optimal sound pulse profile. There are also some standard choices for this class of applications. For example, one measure of the accuracy of the network is the Dice coefficient. This metric is commonly used in machine learning for the task of semantic segmentation, in which input images are divided into regions assigned to different classes. In the use case outlined in the Objects of the Invention, taking the Dice coefficient or Dice loss (as defined in terms of D and U above) to its minimum value of 0 is roughly equivalent to maximizing the purity of a desirable or undesirable mixture component within subregions of the closed-circuit flow chamber 84 cross section, without specifying the shape or size of the subregion itself. For this reason, we refer to the process outlined above as sonic segmentation. In its deployment phase, the apparatus may be operated at high throughput to process a large volume of input material. A capture chamber may be fitted to the outflow 74 to create a physical barrier which contains the segmented populations after they pass through the segmentation grid 76.

The training phase may in principle be accelerated through the use of physical or physics-informed simulation which emulates the device hardware. If the agent 60 or control policy 82 is effectively constrained to the same action space as in the real-world device, it experiences only the change in environment when toggling between simulation and reality. The more closely the simulation represents the real, physical instantiation of the device and the dynamics of the material inside of it, the more effectively the trained algorithm will learn to segment a real fluid flow by proxy. FIG. 6 through FIG. 12 demonstrate such a simulation of the device, for an example application which segments particulates of a single species based upon their velocities.

Figure 6:
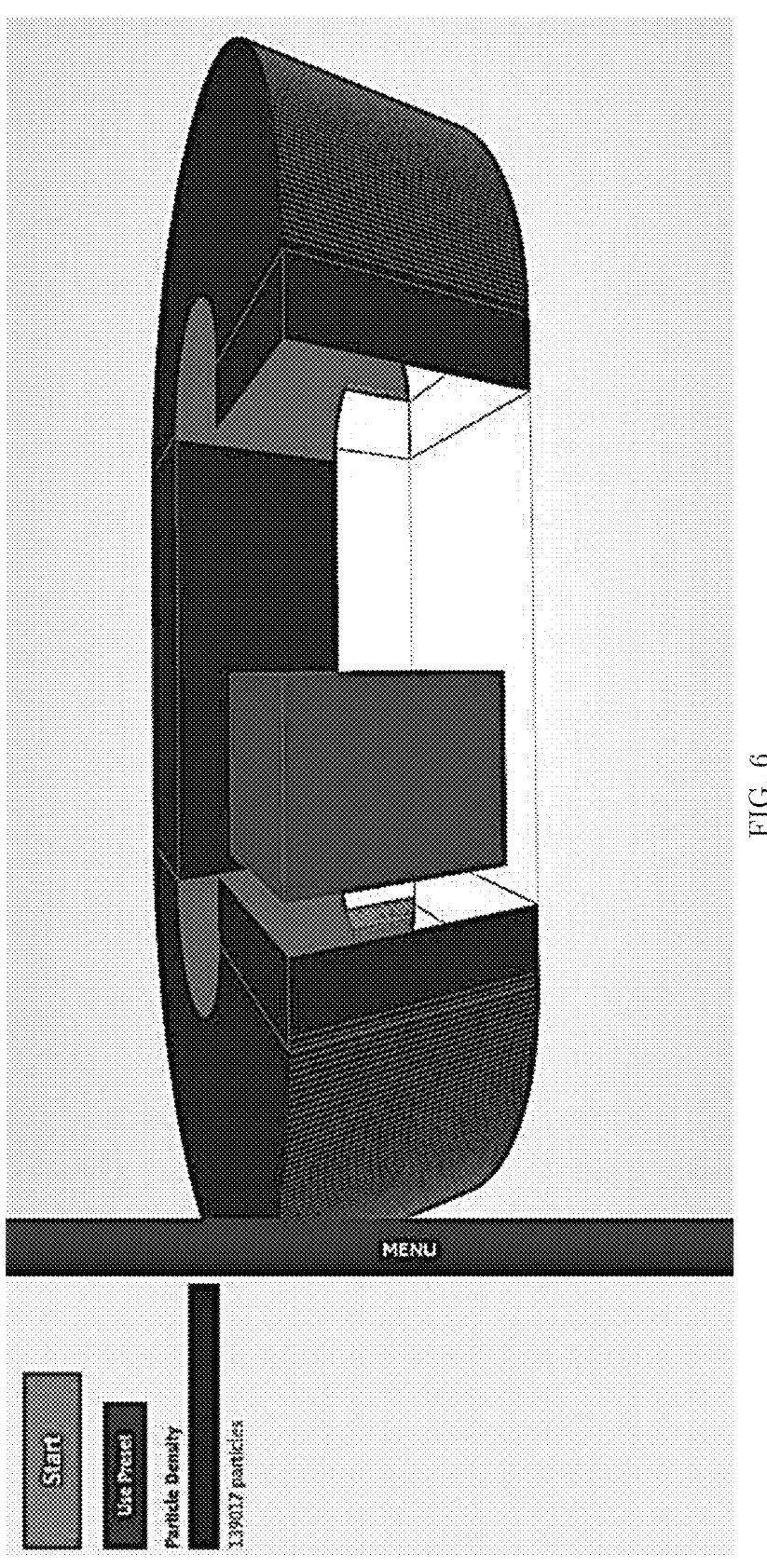
FIG. 6 A rendering of the device in simulation, depicting the process of setting initial conditions for the training phase.

In FIG. 6, a rendering of the example simulated device is shown, and depicts the process of setting initial conditions for the training phase. The closed-circuit component 84 of the flow chamber is shown in gray, and the linear segment 90 comprising of the deployment-phase hardware is cut out so that the user can specify a region (in this case, the cube in the cutout area) in which to generate particulates which circulate continuously through the flow chamber. In the menu at the left, the user may specify the number of particulates to simulate, and start a PIC/FLIP fluid dynamics simulation of those particulates.

Figure 7:
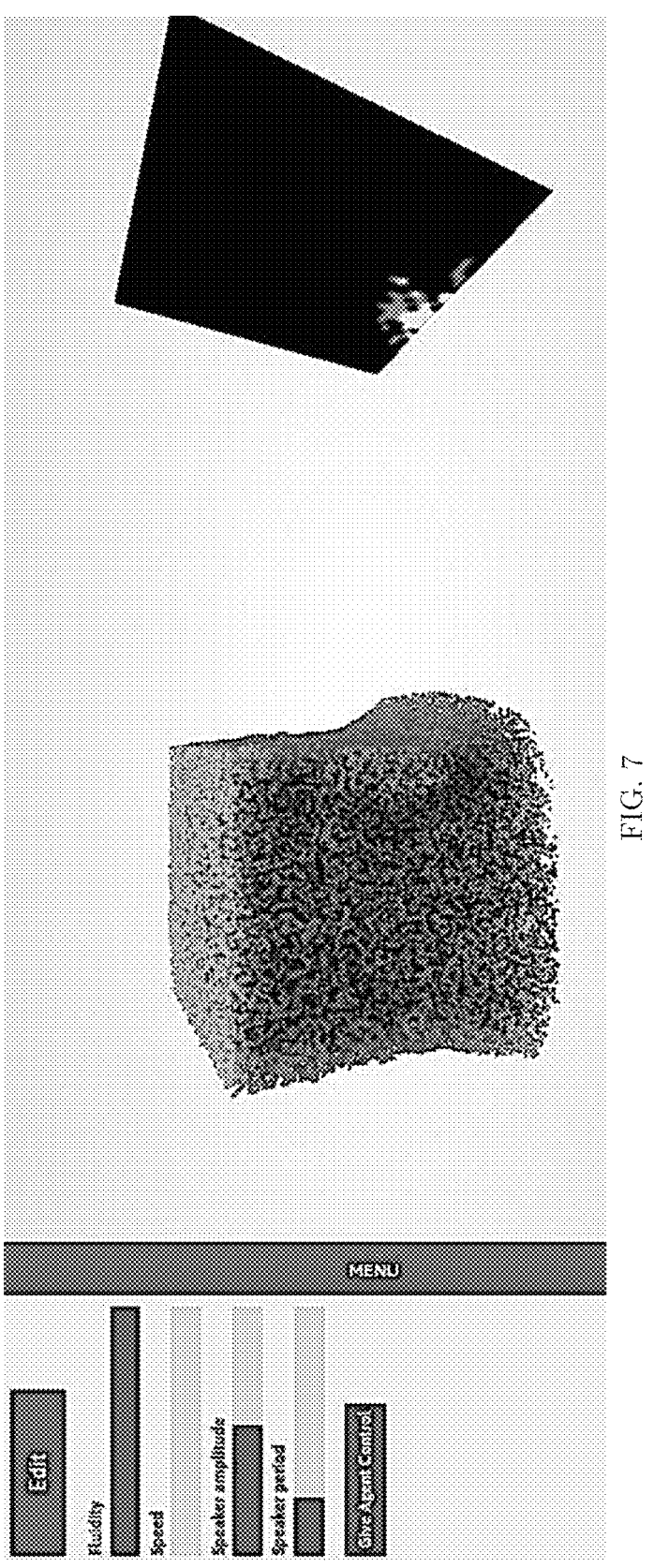
FIG. 7 A rendering of the device in simulation, depicting the initialization of the training phase after starting a PIC/FLIP fluid dynamics simulation.

A rendering of the device during simulation is depicted in FIG. 7, and shows the initialization of the training phase immediately after starting the PIC/FLIP fluid dynamics simulation. The cube in the cutout segment of the flow is replaced with a collection of particulates (in this case, 119,017 of them). These particulates then fall downward under the influence of gravity, which is accounted for in the physical simulation. The black square is a side-by-side reproduction of the simulated device readout 80 sensor output. In this example, the device readout 80 is measuring the particulates closest to the outflow 74, and converting any velocities which are detected above a fixed threshold to white pixels on a black screen. As those velocities increase, the readout color becomes increasingly white. For purposes of flow visualization, this white color is remapped back onto the particulates in the bulk fluid. In the menu at the left, the user may specify the parameters of the fluid dynamics simulation. The sound system includes one speaker 72, whose amplitude and pulse period may be modulated live and on-demand in the menu. An option also exists to yield control of the sound system 64 to an artificially-intelligent agent built and optimized in an OpenAI Gym environment. The program running the agent communicates instructions to and receives data from the simulation via a parallelized bidirectional read-evaluate-print loop (REPL).

Figure 8:
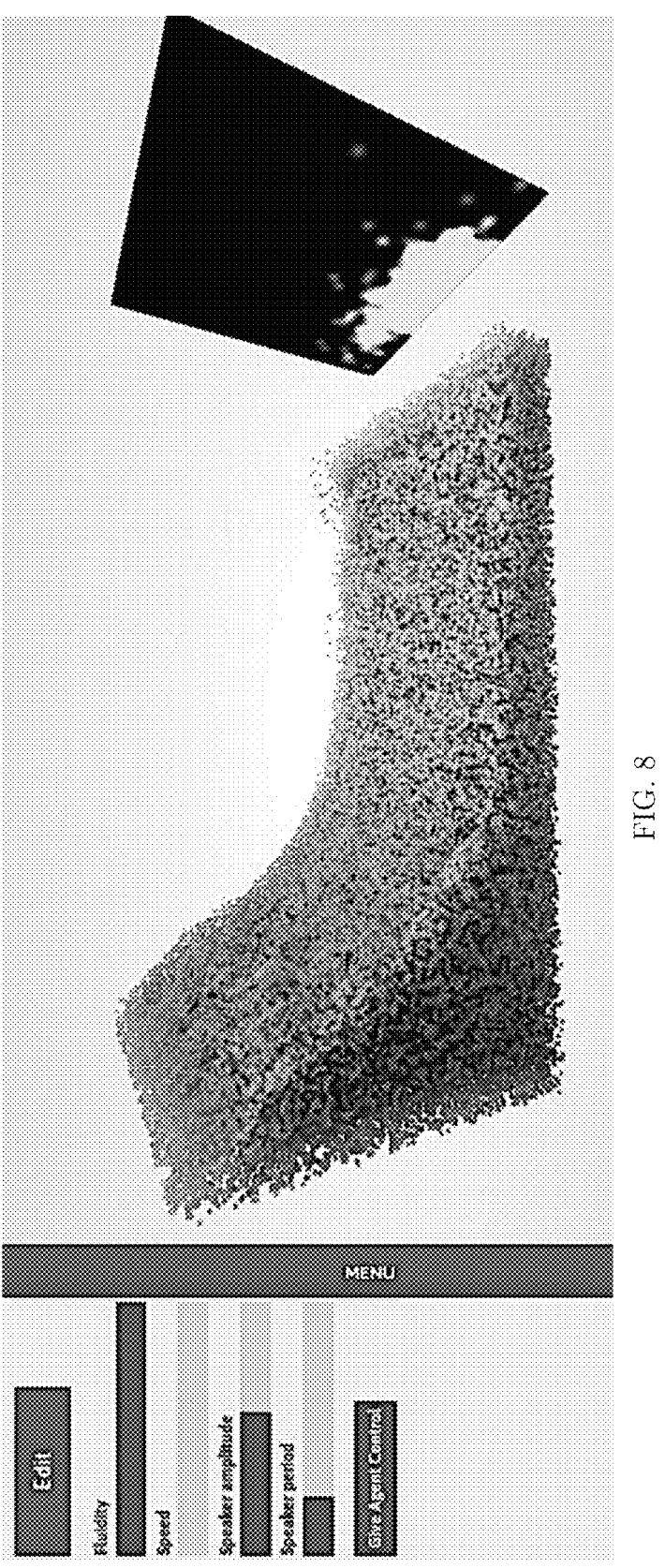
FIG. 8 A rendering of the device in simulation, depicting the steady state configuration of the flow for fixed simulation parameters.

FIG. 8 depicts a rendering of the device in simulation, showing the steady state configuration of the flow for fixed simulation parameters. Particulates circulate from the inflow 70 at the left to the outflow 74 at the right. Once particulates reach the outflow 74, they are registered by the outflow sensor, deleted, processed in the remixer, and subsequently reinstantiated at the inflow 88 by the segmentation substrate 68. This emulates the training phase of the device, wherein a fixed population of particulates is circulated in the flow chamber. The readout only picks up the velocities which are above a fixed threshold, so the white pixels concentrate in the center of the screen due to slight frictional edge effects at the cross-sectional boundaries.

Figure 9:
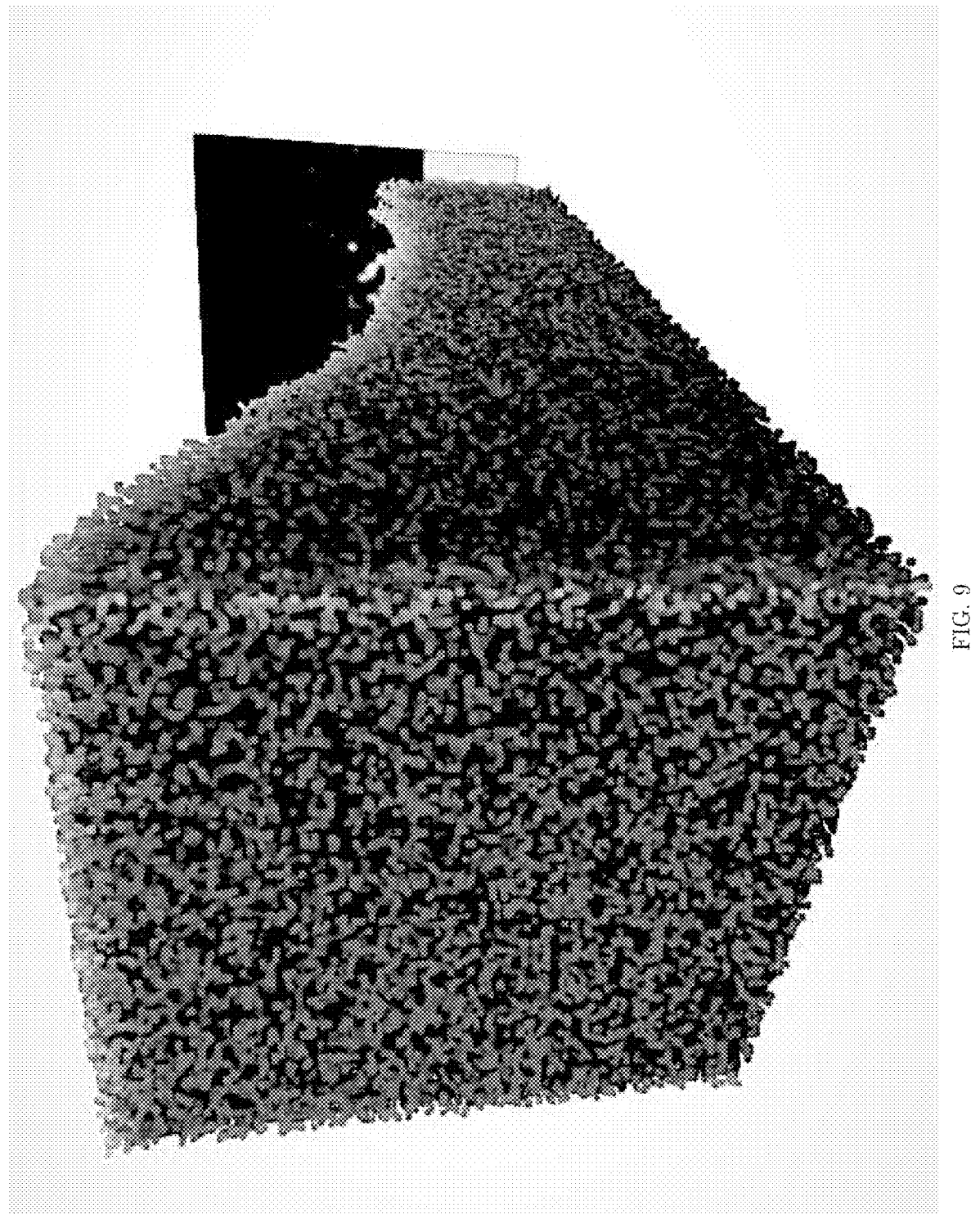
FIG. 9 A view of the simulated device inflow in the steady state configuration, showing the effect of the remixer and segmentation substrate.

In FIG. 9, the simulated device inflow is depicted in the steady state flow configuration, showing the effect of the remixer and segmentation substrate 68. When particulates are reinstantiated at the inflow 70, they are endowed with a fixed forward velocity and a position which is uniform and random in the inflow 70 cross-section. This is immediately visible as the white layer coating the square cross-section of the inflow 70.

Figure 10:
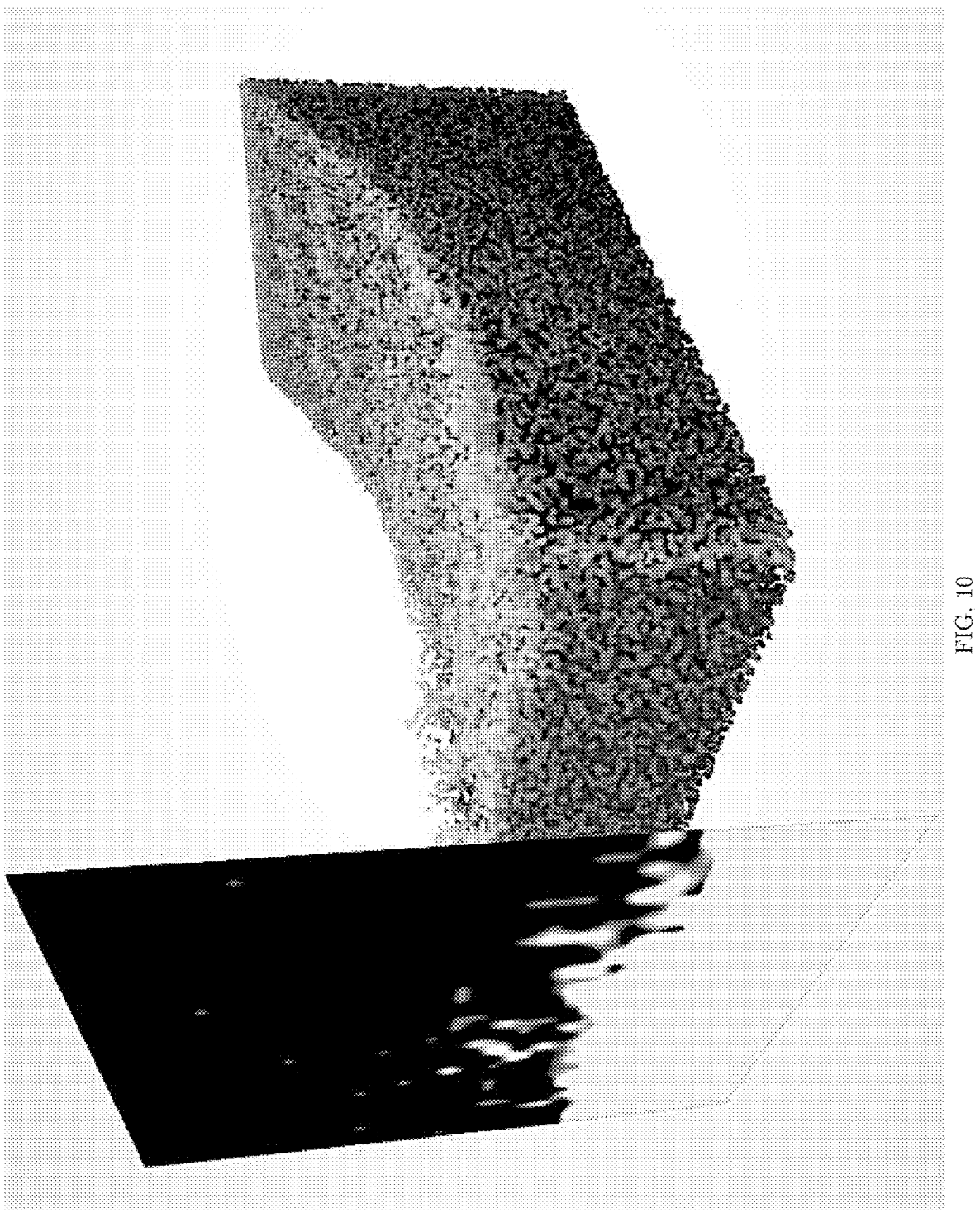
FIG. 10 A view of the readout data side-by-side with the simulated device outflow, showing a clear correspondence between the two.
Figure 11:
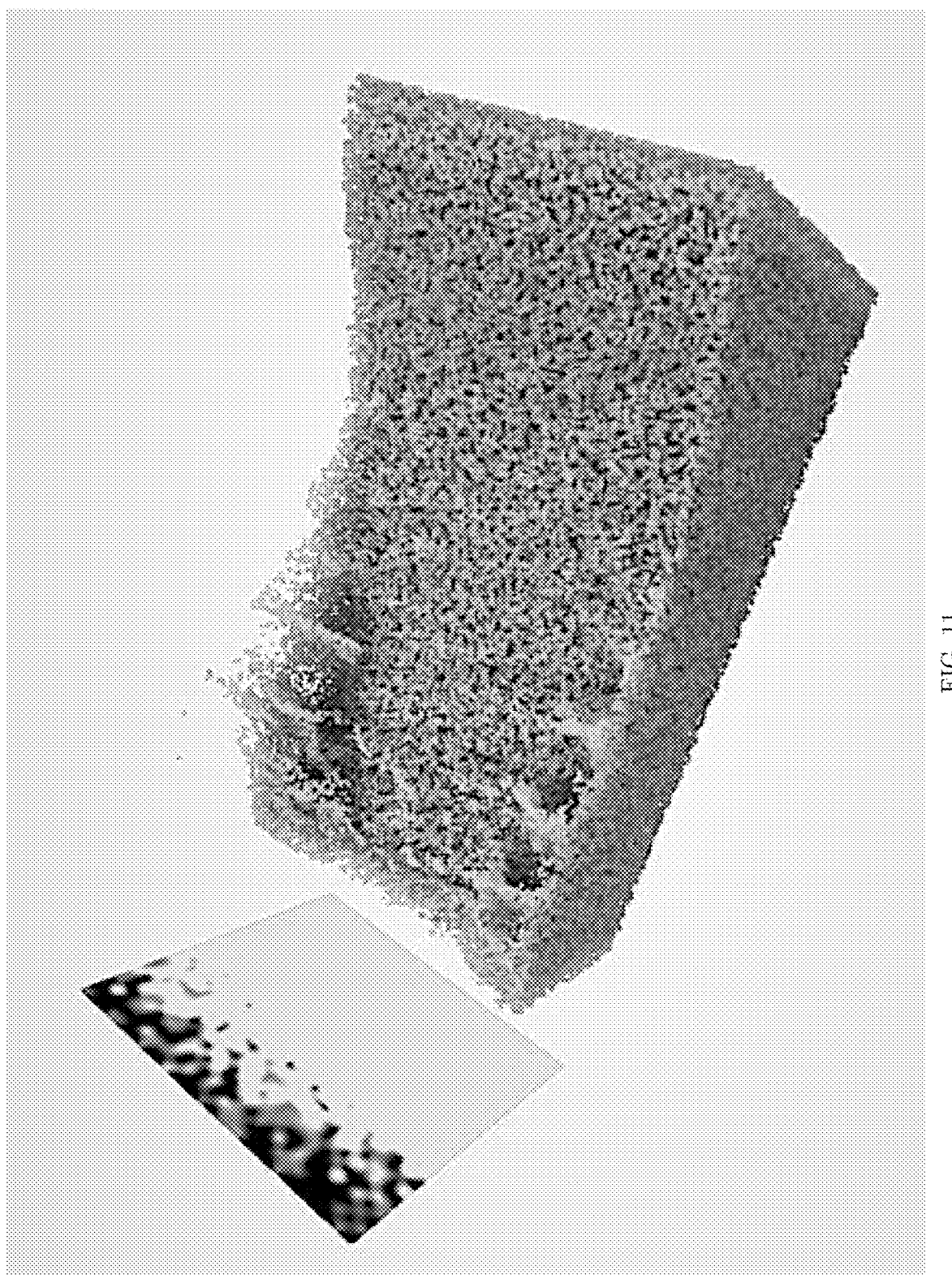
FIG. 11 A top-down view of the PIC/FLIP fluid dynamics simulation, depicting ripples from sound waves emanating from the sound system which are manipulating the particulates.

In FIG. 10, the readout data is depicted side-by-side with the simulated device outflow 74, showing a clear correspondence between the two. FIG. 11 shows a top-down view of the PIC/FLIP fluid dynamics simulation, depicting ripples from sound waves emanating from the sound system which are manipulating the particulates.

Figure 12:
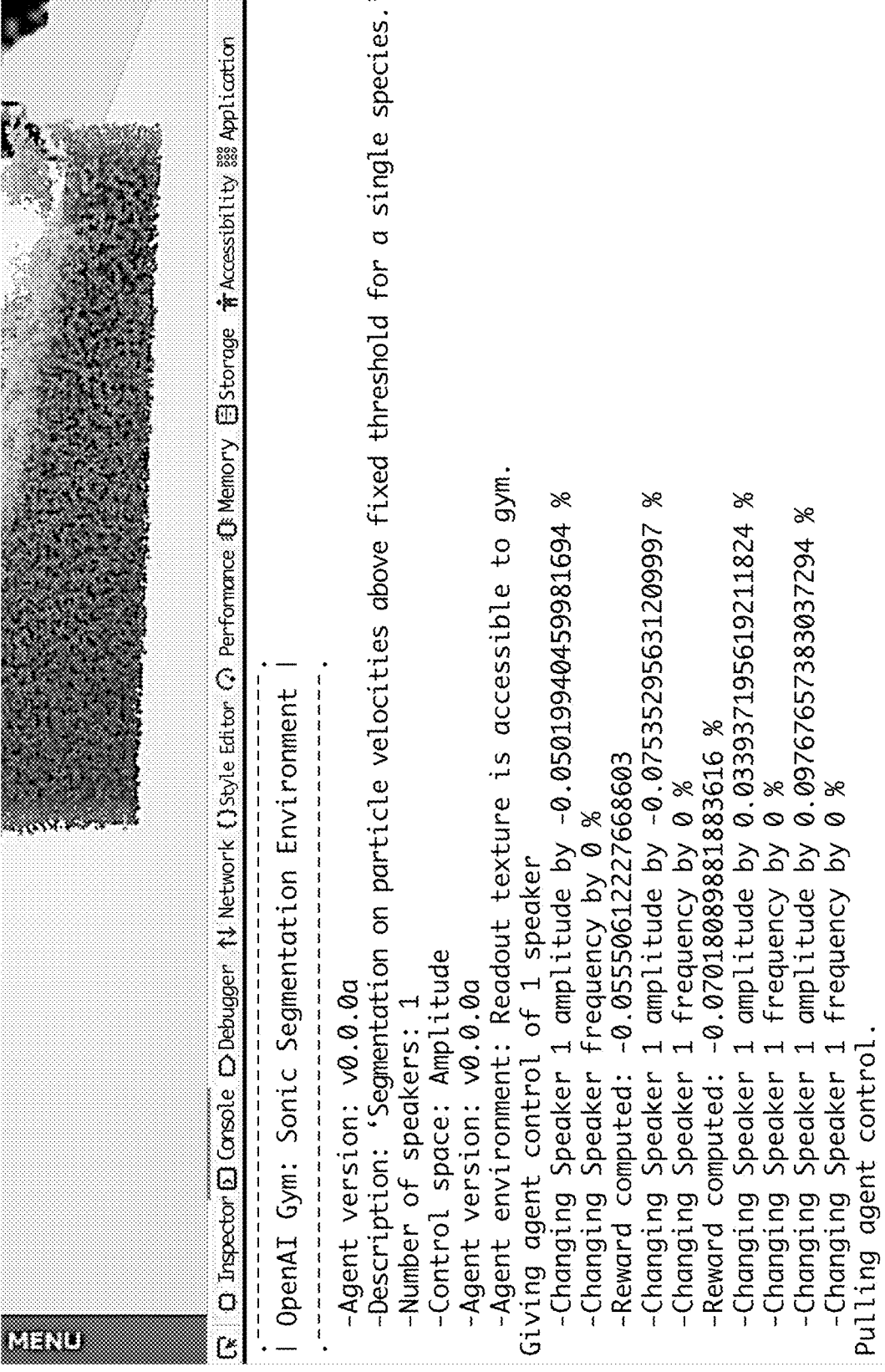
FIG. 12 A view of the terminal output from the agent interaction with the PIC/FLIP simulation.

Finally, FIG. 12 shows a view of the terminal output from the agent 60 interaction with the PIC/FLIP simulation. The agent 60 makes decisions at a fixed frequency and logs each of those decisions in the terminal. At a separate frequency, the agent 60 computes a reward or punishment from the readout by computing time derivatives of a continuous variant of the Dice coefficient. The agent 60 subsequently updates its control policy 82 with this learned information. The user may remove the agent 60's permissions to control the device and halt the training by clicking a button in the menu.

There are a variety of confounding factors and utilization subtleties to consider in the implementation of this apparatus. For instance, noise pollution can pose a human and ecological health hazard, so employing noise canceling technology or sound insulation may be necessary for this technology in certain embodiments. In order to scale the throughput of the device, it may also be possible to use multiple instantiations of the device side-by-side. However, such an orchestra of devices may not be able to operate fully independently of one another—it is probable in that scenario that the training process will need to occur in bulk, rather than unit-by-unit. The device would also need to receive electrical power from an emissions-free source in order to meaningfully capture greenhouse gases. Lastly, because of the extremely modular nature of the setup, the agent's control policy can be optimized under satisficing constraints to achieve a diverse range of goals beyond the ones outlined here, to optimize on a per-facility basis. For example, the control policy 82 may be trained under strict requirements that the power usage, net operating cost, or sound volume not exceed certain values.

The systems and methods described herein may in various embodiments be implemented using any combination of hardware and software. For example, in one embodiment, the systems and methods may be implemented using a computer system or a collection of computer systems, each of which includes one or more processors executing program instructions stored on a computer-readable storage medium coupled to the processors. The program instructions may implement some of the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device may also include one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. The computer systems may share the same persistent storage devices or may share a pool of persistent storage devices, with the devices in the pool representing the same or different storage technologies.

The computer system may include one or more system memories that may store code/instructions and data accessible by the processor(s). The system's memory capabilities may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

Unless otherwise stated, all technical and scientific terms used herein have the same meaning as commonly understood by one of ordinary skill in the art to which this invention belongs. All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

BIBLIOGRAPHY

[1] K. L. Cashdollar, I. A. Zlochower, G. M. Green, R. A. Thomas, and M. Hertzberg, "Flammability of methane, propane, and hydrogen gases," *Journal of Loss Prevention in the Process Industries* 13 no. 3, (2000) 327-340. https://wwvw.sciencedirect.com/science/article/pii/S0950423099000376. 3

[2] G. Swift, D. Geller, and P. Spoor, "SEPARATION OF GAS MIXTURES BY THERMOACOUSTIC WAVES," 06, 2001. 4

[3] G. W. Swift and D. A. Geller, "Thermoacoustic Soret separation," *The Journal of the Acoustical Society of America* 152 no. 5, (2022) 3078-3090, https://doi.org/10.1121/10.0015232. https://doi.org/10.1121/10.0015232. 4

[4] D. A. Geller and G. W. Swift, "Thermoacoustic enrichment of the isotopes of neon," *The Journal of the Acoustical Society of America* 115 no. 5, (2004) 2059-2070, https://doi.org/10.1121/1.1687831. https://doi.org/10.1121/1.1687831. 4

[5] D. Geller and G. Swift, "Thermodynamic efficiency of thermoacoustic mixture separation," *The Journal of the Acoustical Society of America* 112 (09, 2002) 504-10. 4

[6] J. Degrave, F. Felici, J. Buchli, M. Neunert, B. Tracey, F. Carpanese, T. Ewalds, R. Hafner, A. Abdolmaleki, D. Casas, C. Donner, L. Fritz, C. Galperti, A. Huber, J. Keeling, M. Tsimpoukelli, J. Kay, A. Merle, J.-M. Moret, and M. Riedmiller, "Magnetic control of tokamak plasmas through deep reinforcement learning," *Nature* 602 (02, 2022) 414-419. 5

[7] IPCC, *Climate Change* 2013: *The Physical Science Basis. Contribution of Working Group I to the Fifth Assessment Report of the Intergovernmental Panel on Climate Change*. Cambridge University Press, Cambridge, United Kingdom and New York, NY, USA, 2013. www.climatechange2013.org. 6

What is claimed:

1. A method for thermoacoustically separating fluids in a mixture, comprising the steps of:

receiving into a flow chamber an impure fluid mixture comprising a plurality of separable subcomponents, and wherein a desired subcomponent of the plurality of subcomponents is present in the mixture in a first concentration;

using an agent, directing a sound pulse waveform into the impure mixture in the flow chamber;

using a sensor at a cross-section of the flow chamber, sampling a concentration of the desired subcomponent to determine a second concentration;

if the second concentration of the desired subcomponent is higher than the first concentration of the desired subcomponent by a pre-determined minimum measure, signaling a reward to the agent;

updating a control policy of the agent, wherein the control policy makes a change to the sound pulse waveform;

repeating the sampling, signaling a reward, and updating a control policy of the agent steps until the second concentration reaches a desired concentration value;

after reaching the desired concentration value, again directing the sound pulse waveform into the impure mixture in the flow chamber to create processed material; and separating the processed material into at least one desired output population.

2. The method of claim 1, wherein the step of directing a sound pulse waveform into the impure mixture in the flow chamber is performed continuously over a training period.

3. The method of claim 1, wherein the step of sampling a concentration of the desired subcomponent is performed at a segmentation grid.

4. The method of claim 1, further comprising the step of, if the second concentration of the desired subcomponent is lower than the first concentration of the desired subcomponent by a pre-determined minimum measure, signaling a punishment to the agent.

5. The method of claim 1, wherein the step of separating the processed material into at least one desired output population comprises the step of directing the processed material into a plurality of pipes at an outflow of the flow chamber.

6. The method of claim 1, wherein the step of using a sensor at a cross-section of the flow chamber comprises the step of measuring a particulate size of the impure mixture.

7. The method of claim 1, wherein the step of using a sensor at a cross-section of the flow chamber comprises the step of applying optical spectroscopy to the impure mixture.

8. An apparatus for thermoacoustically separating fluids in a mixture, comprising:

a flow chamber, wherein the flow chamber comprises an open-circuit component and a closed-flow component connected to the open-circuit component, and wherein the open-circuit component comprises an inflow and an outflow;

a segmentation grid positioned at the outflow of the open-circuit component, wherein the outflow captures portions of the mixture at a plurality of distinct areas of a cross-section of the outflow;

a sound system positioned to direct sound into the open-circuit component of the flow chamber;

a remixer at the closed-flow component of the flow chamber wherein the remixer is configured to churn the mixture within the closed-flow component;

at least one sensor in the flow chamber; and a controller connected to the sound system, the remixer, and the at least one sensor, wherein the controller is configured to control the sound system and the remixer from outside of the flow chamber based on an input signal to the controller from the at least one sensor.

9. The apparatus of claim 8, wherein the at least one sensor comprises at least one visual sensor.

10. The apparatus of claim 9, wherein the at least one visual sensor comprises at least one particulate size analyzer.

11. The apparatus of claim 8, wherein the at least one sensor comprises at least one air pressure sensor.

12. The apparatus of claim 8, wherein the at least one sensor comprises at least one radiation sensor.

13. The apparatus of claim 8, wherein the at least one sensor comprises at least one optical imager.

14. The apparatus of claim 8, wherein the at least one sensor comprises at least one photosensor.

15. The apparatus of claim 8, wherein the at least one sensor comprises a magnetometer.

16. The apparatus of claim 8, wherein the at least one sensor comprises an electromagnetic inductor.

17. The apparatus of claim 16, wherein the electromagnetic inductor comprises a metal detector.

18. The apparatus of claim 8, wherein the sound system comprises a plurality of speakers positioned to direct sound into the open-circuit component of the flow chamber.

19. The apparatus of claim 18, wherein the sound system further comprises an audio amplifier connected to the plurality of speakers.

20. The apparatus of claim 19, further comprising a sound controller connected to the audio amplifier and configured to control an amplification level for the plurality of speakers connected to the audio amplifier wherein the sound controller controls a sound level in the open-circuit component of the flow chamber.

21. The apparatus of claim 8, wherein the controller comprises an agent configurable to automate control of the sound system and the remixer through the controller, and further wherein the agent is trainable during a training phase operation of the flow chamber.

22. The apparatus of claim 8, wherein the segmentation grid comprises a plurality of pipes positioned at different areas of the outflow of the flow chamber.

23. The apparatus of claim 22, further comprising a segmentation substrate at the inflow of the flow chamber, wherein the segmentation substrate is configured to apply an initial condition to the mixture.

24. A method for separating fluids in a mixture, comprising the steps of:

receiving into an open-circuit flow chamber a mixture comprising a plurality of separable subcomponents, wherein a desired subcomponent of the plurality of subcomponents is present in the mixture in a first concentration;

using a sound system comprising a plurality of speakers, directing an acoustic waveform into the open-circuit flow chamber to produce a second concentration of the desired subcomponent in a processed material, wherein the acoustic waveform was generated in a training phase from among a plurality of possible acoustic waveforms; and separating the processed material into at least one desired output population by directing the processed material through a plurality of pipes positioned at distinct regions of an outflow cross-section of the open-circuit flow chamber.

25. The method of claim 24, further comprising the step of segmenting the mixture with a segmentation substrate before receiving the mixture into the open-circuit flow chamber.

\* \* \* \* \*